Nov. 2, 1965  L. E. NICKLA  3,215,291

COTTON PICKER COMPACTOR

Filed April 14, 1964  2 Sheets-Sheet 1

INVENTOR
Louis E. Nickla
John J. Kowalik
Atty.

United States Patent Office  
3,215,291  
Patented Nov. 2, 1965

3,215,291  
COTTON PICKER COMPACTOR  
Louis E. Nickla, Memphis, Tenn., assignor to International Harvester Company, Chicago, Ill., a corporation of New Jersey  
Filed Apr. 14, 1964, Ser. No. 359,736  
7 Claims. (Cl. 214—83.3)

This invention relates to a mechanism for picking cotton in the field commonly known as a cotton harvester and more specifically to novel means for compacting the fluffy and loose cotton which is delivered to the basket which forms part of the harvester.

It is well known that one of the limitations of cotton harvesters is in the storage capacity of the harvesting machine, in that cotton which is delivered to the basket quickly fills the basket and it must be frequently emptied in order to proceed with the harvest. The physical dimensions of the basket are well established for it is necessary to consider the center of gravity of the harvester, its ability to be transported over public roads and its passage through the fields.

In the handling of cotton it is necessary that it be treated gently so as not to tangle or "rope" the fibers to prevent formation of ringlets and to keep the seed from cracking which would, of course, stain the staple and break down the texture of the fibers.

Furthermore, since the cotton is fluffy, it is necessary to provide means which would effectively compact the cotton without incurring the disadvantages heretofore recited.

A general object of the invention is to provide a novel cotton compacting device which is of simple and durable construction and which is readily adaptable for mounting within cotton harvesting machines heretofore produced.

A further object of the invention is to provide a novel compacting device for cotton which incorporates a skeletal framework which while effectively compacting the cotton presents minimal interference to the discharge of the cotton from the receptacle.

A still further object of the invention is to provide a novel cotton compacting device which in no way interferes with the pin thrash separation from the cotton and which in its operation will not create disturbing air movements.

A still further object of the invention is to provide a novel cotton compacting device which readily fits into the storage baskets of current cotton pickers and wherein the compacting device includes an oscillatable vane of skeletal construction providing large air passage spaces between the members forming the vane to prevent developing fanning air blasts such as would cause the cotton to fluff pursuant to operation of the compactor.

A further object of the invention is to provide a novel compactor within the cotton picker basket which has sloping sides, the compactor comprising a vane which is disposed normal to such sides so that cotton which is entered into the basket is caused to gravitate toward the compactor for engagement thereby.

More specifically, the invention comprises the provision of a skeletal generally planar vane which is pivoted to the bottom of the cotton picker basket on a substantially horizontal axis, said vane being swingable from an intermediate vertical position, between the front and rear ends of the basket, forwardly and rearwardly in order to compact the cotton which is cascaded inside the top of the basket, said vane being actuated by suitable means which, in the present instance includes a double-acting cylinder disposed at the bottom of the basket and anchored thereto at one end and at its other end anchored to the compacting vane structure intermediate the ends thereof.

A further object of the invention is to provide in a cotton harvester a novel compacting device which functions not only to reduce the bulk of the cotton in the basket but clears the cotton pile from the stream of cotton and debris so as to maintain the cleaning grates unobstructed to discharge the trash.

Another principal object of the invention is to provide a mechanism for eliminating the stopping time of the harvester in the field for transferring cotton in the basket whereby increasing its operational efficiency.

Another object of the invention is to eliminate the hazards of having the operator climbing over the equipment on a high unstable perch to tramp down the cotton in the basket.

A still further object is to devise in a cotton harvester a novel compacting device which functions to control the quantities of cotton being discharged from the harvester basket when dumping into a wagon so as to prevent spillover.

These and other objects and advantages inherent in and encompassed by the invention will become more readily apparent from the specification and the drawings wherein.

Figure 1:
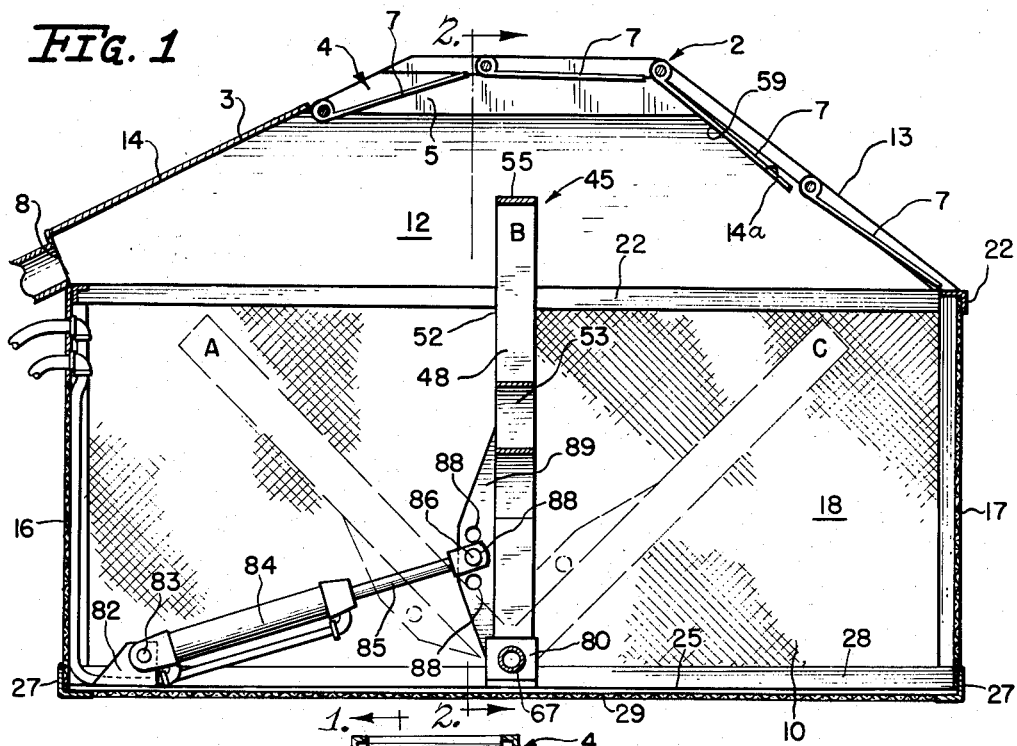
FIGURE 1 is a vertical view taken substantially on line 1—1 of FIGURE 2 of a basket with the compactor therein.
Figure 2:
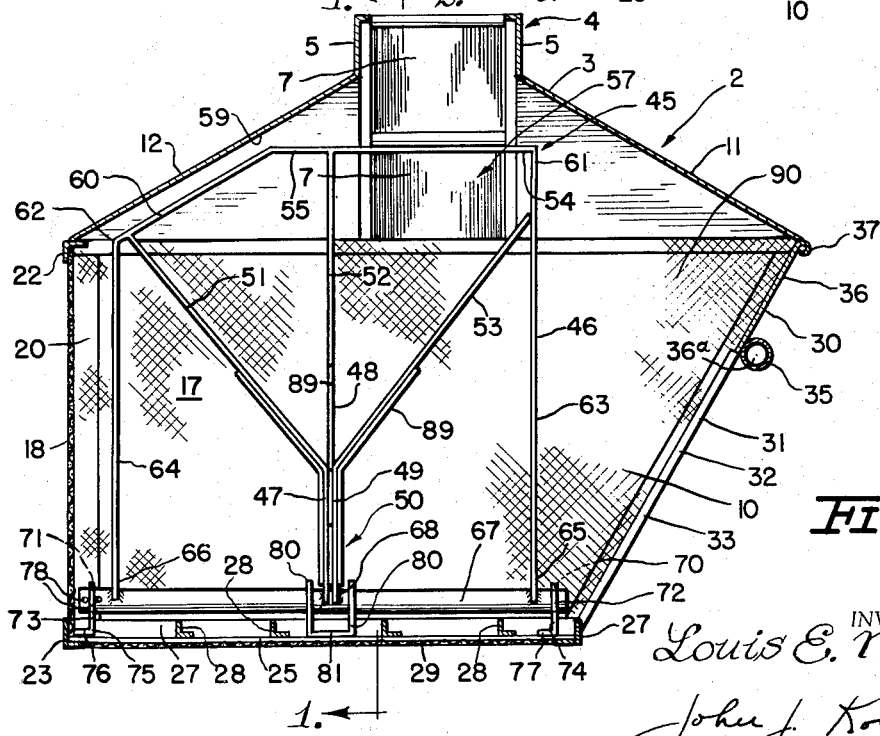
FIGURE 2 is a sectional view on line 2—2 of FIGURE 1 with the cylinder removed and showing the compactor in side elevation.
Figure 3:
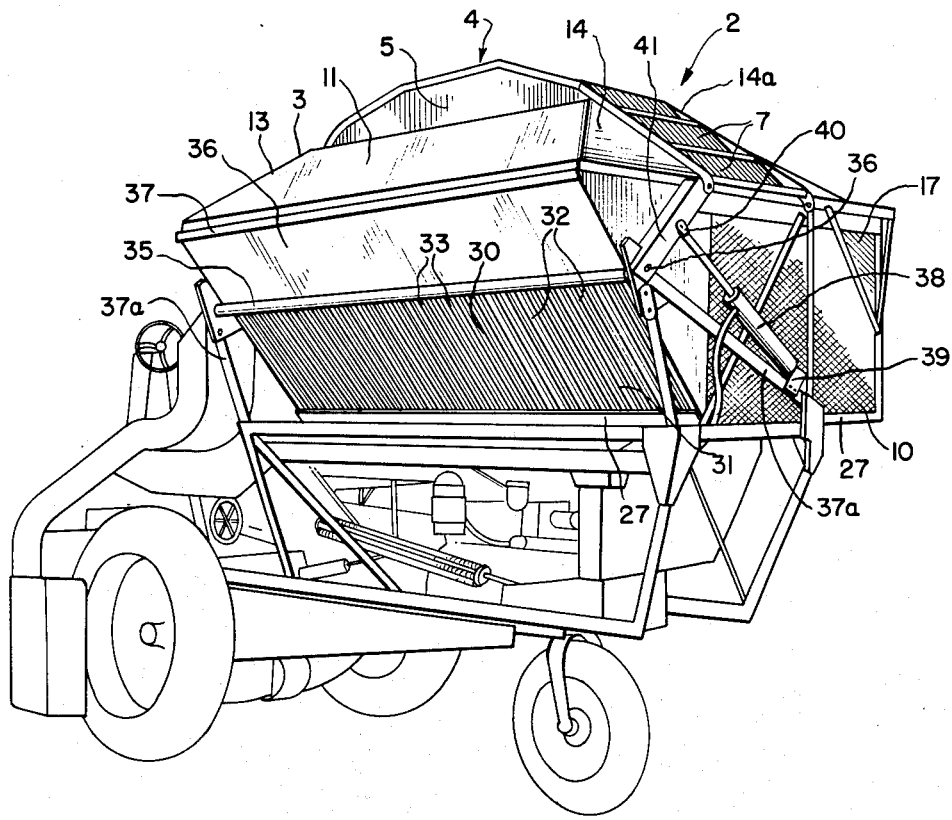
FIGURE 3 is a rear perspective view of a cotton picker incorporating the invention.

Describing the invention in detail and having particular reference to the drawings there is shown a typical basket generally designated 2 of a cotton harvester, said basket or receptacle having an upper cover portion 3 which is formed with a central upwardly projecting tunnel structure 4 having solid sheet metal sides 5, 5 and between the sides there is a top composed of a series of grates 7 which are in alignment with a cotton inlet 8 through which the cotton is blown into the container against the grating 7 for discharging pin trash and other foreign matter while the cotton, being of sufficient bulk and of less density, is caused to cascade into the bottom portion 10 of the basket. The cover portion 3, in addition to the tunnel structure, comprises a somewhat pyramidal shaped upwardly sloping solid sheet metal side panels 11 and 12 which at their upper edges merge with the lower ends of the side walls 5, 5 of the tunnel structure. The cover has a vertical front panel 13 and an upwardly sloping rear panel 14 which merge with the lateral panels 11 and 12. The rear panel 13 affords a suitable slot 14a which is occupied by the grating 7 as best seen in FIGURE 3.

The bottom portion 10 of the basket comprises front and rear upright side portions 16 and 17 and a screened lateral side portion 18 each of these portions being formed of a plurality of vertical stringers 20 and top and bottom re-enforcing angles or beams 22, 23 which support screen 18. The bottom portion 25 of the basket is also substantially flat and it is comprised of a peripheral angle iron beam structure 27 which is interconnected by a plurality of lateral angles or beams 28. The bottom is also provided with a screen 29 which is adapted to sift out dirt, it being understood that the openings in the screens are dimensioned large enough to sift out dirt and trash but small enough to prevent the passage of seed cotton therethrough. The remaining side 30 of the receptacle inclines upwardly and outwardly and in the lower portion 31 thereof is formed of a plurality of substantially parallel rods or bars 32, 32 defining narrow elongated spaces 33 therebetween, said bars 32 being connected at the lower ends to the frame member 27 and the upper end being connected to a pivot shaft 35 which also serves as a connection for the lower edge of an extension panel 36 which has its upper edges formed with a rolled lip 37 upon which the cotton is adapted to spill over pursuant to dumping of the basket laterally about the pivot shaft 35 which is carried from the support framework 37a suitably mounted on the associated tractor or chassis not shown, as well known to those skilled in the art. The basket is tilted by means of the hydraulic mechanism 38 which is connected as at 39 and 40 between the framework 37 and lifting arm 41 which is connected to the basket. This structure is commonly well known to those skilled in the art.

The basket or container herein described is provided with a compacting structure or vane assembly generally designated 45 which is herein shown as a skeletal planar framework 46 which extends transversely to the side walls 18, 30 of the basket. The vane assembly includes a plurality of strut members or braces 47, 48 and 49 which are interconnected at their lower ends generally designated at 50 and intermediate their ends are furcated to provide several fingers 51, 52 and 53, it being observed that the finger 52 is substantially straight whereas the fingers 51 and 53 diverge in opposite directions from the finger 52 which substantially bisects the angle between the members 51, 53. The distal or outer ends of fingers 51, 52 and 53 are interconnected to the inner edge 54 of a peripheral frame member or brace 55. The upper portion 57 of the vane projects into the cover cavity 59 and the edge brace 55 has a portion 60 which is angled generally parallel to the wall portion 12 and spaced therefrom. The opposite ends of the peripheral portions 55, 60 are connected as at 61, 62 to the upper ends of the side members 63, 64 of the vane or compactor. The lower ends of the side members or straps 63, 64 are connected at 65, 66 to a pivot member or rockshaft 67 which intermediate its ends is integrally connected as at 68 to the lower end structure 50 of the members 47, 48 and 49. The rockshaft 67 is pivoted within openings 70 and 71 in vertical plate portions 72, 73 of brackets 74, 75 which have out-turned flange portions 76, 77 suitably secured as by bolting or otherwise to the frame members 27, 23 thereadjacent. The axle or rockshaft 67 is held in place by means of a pair of pins 78 which are passed through appropriate openings in the said shaft 67 and disposed at opposite sides of the flange or plate 71 of the bracket 75.

The rockshaft 67 is pivoted intermediate its ends to the upright webs 80 of a U-section or channel member 81 which is located substantially centrally of the basket and the U-section channel member provides the securement for upright anchor 82 adjacent to the front side 16 of the basket on the bottom thereof for a pivot connection 83 to the two-way hydraulic cylinder 84 which has a rod 85 projecting from the opposite end thereof. The rod is pivoted by means of a pin 86 to any pair of several pairs of openings 88 on brackets 89 which are formed and welded to the legs 51 and 53 of the vane structure.

The vane is normally in position away from cotton inlet. When the cotton pile begins to block the rearmost grate, the vane is moved to position A nearest to inlet then immediately returned to original position C. This is repeated each time cotton begins to block rear grates. As the basket fills, the stroke of the vane shortens to a central area of operation B. The compacting device receives the cotton from directly above and also from the gravitation along the side 30 of the basket wherein it will be seen that there is a triangular shaped area generally designated 90 provided for accommodating the cotton to clear the compactor as it is being discharged pursuant to tipping the basket into an associated wagon. It will be observed that in addition to the vane serving as a compactor it also serves to facilitate discharging the basket inasmuch as it can be actuated by the operator if there is any residual cotton left in the basket in order to dislodge it from the basket and to facilitate its discharge into the wagon.

It has been found that the instant invention gently compresses the cotton and reduces its bulk to such an extent that up to one third of the time is saved over the previous practice and furthermore, there is very little need now to run the wagons into the field since the operator can well judge the capacity of the basket and when he sees that it is quite full he can operate the compactor and get additional space to run out of the row. Thus, there is the additional saving of time in that the wagon does not have to be maneuvered carefully between the rows of the cotton and there is no reason for injuring the cotton plants by running such wagon through the field.

Having described the preferred form of the invention it will be readily apparent that various other embodiments of the invention will become obvious within the scope of the foregoing disclosure and within the scope of the appended claims.

What is claimed is:

1. In a field-going cotton picker of the type having a mobile structure including picker means, a container for cotton harvested by said picker means, said container having an upper portion, and pneumatic conveying means for delivering an aggregate of cotton and trash from the picker means to the container across the upper portion thereof, said container comprising a grate structure in the path of a stream of aggregate including cotton and trash against which the aggregate is impinged to separate the trash from the cotton so that the cotton drops into the container, and an oscillatable compactor vane mounted in said container out of the path of the stream of aggregate and selectively operable by an operator while mobile in the field to compact the cotton and move the same from obstructing said stream of aggregate.

2. The invention according to claim 1 and said vane comprising a skeletal structure.

3. The invention according to claim 1 and said vane subdividing said container, and means for positioning the vane to entrap and hold a portion of the cotton in the container during dumping of the container.

4. The invention according to claim 1 and said container having two pairs of upright sides and said vane extending transversely of one pair of sides and pivotally mounted in the container intermediate the other pair of sides and operable to compress the cotton against said other pair of sides.

5. In a cotton receptacle having a bottom side and upright front and rear sides and lateral sides, a compactor comprising a vane structure extending upwardly from said bottom side and having a lower edge substantially centered between said front and rear sides, means pivoting said structure at said lower edge thereof on an axis transverse to said lateral sides and generally parallel to the bottom side, and means for selectively oscillating said structure for compacting cotton deposited within the receptacle against the front and rear sides of the receptacle.

6. The invention according to claim 5 and said vane structure being skeletal and having large void areas therein to permit passage of air therethrough to minimize fanning of the cotton.

7. The invention according to claim 5 and said means for oscillating said vane structure comprising a ram connected between the receptacle and a portion of the vane structure and disposed adjacent to the bottom side of the container.

(References on following page)

References Cited by the Examiner

UNITED STATES PATENTS

| | | | |
|---|---|---|---|
| 1,837,034 | 12/31 | Freund | 100—209 X |
| 2,686,466 | 8/54 | Lee | 100—209 X |
| 2,772,445 | 12/56 | Hubbard | 302—59 X |
| 2,832,484 | 4/58 | Schneider | 214—83.3 |
| 2,957,726 | 10/60 | Fergason | 214—515 X |
| 2,986,992 | 6/61 | Patros et al. | 100—233 X |
| 3,030,139 | 4/62 | Fite | 298—8 X |
| 3,094,227 | 6/63 | Dempster et al. | 214—82 |
| 3,111,346 | 11/63 | Harbers et al. | 298—8 |
| 3,119,136 | 1/64 | Newsom | 15—79 |
| 3,128,587 | 4/64 | Nickla | 302—59 |
| 3,134,118 | 5/64 | Chouinard | 15—79 |
| 3,134,321 | 5/64 | Loehnert | 100—209 X |

GERALD M. FORLENZA, *Primary Examiner.*